(12) United States Patent
Todd et al.

(10) Patent No.: US 11,169,965 B2
(45) Date of Patent: *Nov. 9, 2021

(54) METADATA-BASED DATA VALUATION

(71) Applicant: EMC IP Holding Company LLC, Hopkinton, MA (US)

(72) Inventors: Stephen Todd, North Conway, NH (US); Anand Singh, Framingham, MA (US); Sudhir Vijendra, Westborough, MA (US); Narayanan Krishnakumar, Acton, MA (US); Qing Ye, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/697,372

(22) Filed: Nov. 27, 2019

(65) Prior Publication Data

US 2020/0097446 A1 Mar. 26, 2020

Related U.S. Application Data

(63) Continuation of application No. 15/072,557, filed on Mar. 17, 2016, now Pat. No. 10,528,522.

(51) Int. Cl.
*G06F 16/00* (2019.01)
*G06F 16/14* (2019.01)
*G06F 16/16* (2019.01)

(52) U.S. Cl.
CPC ............ *G06F 16/14* (2019.01); *G06F 16/164* (2019.01)

(58) Field of Classification Search
CPC ...... G06F 16/14; G06F 16/164; G06F 16/215; G06Q 10/10
USPC .................................................. 707/600–899
See application file for complete search history.

(56) References Cited

U.S. PATENT DOCUMENTS

| | | | |
|---|---|---|---|
| 6,715,145 B1 | 3/2004 | Bowman-Amuah |
| 6,957,227 B2 | 10/2005 | Fogel et al. |
| 7,574,426 B1 | 8/2009 | Ortega |
| 7,580,848 B2 | 8/2009 | Eder |
| 7,752,195 B1 | 7/2010 | Hohwald et al. |
| 7,890,451 B2 | 2/2011 | Cancel et al. |
| 7,970,729 B2 | 6/2011 | Cozzi |
| 8,561,012 B1 | 10/2013 | Holler et al. |
| 8,645,412 B2 | 2/2014 | Woodruff et al. |
| 8,719,255 B1 | 5/2014 | Pope et al. |
| 8,812,496 B2 | 8/2014 | Renders et al. |

(Continued)

OTHER PUBLICATIONS

Wikipedia, "Value Chain," https://en.wikipedia.org/w/index.php?title=Value_chain&printable=yes, Jun. 6, 2016, 7 pages.

(Continued)

*Primary Examiner* — Michelle N Owyang
(74) *Attorney, Agent, or Firm* — Ryan, Mason & Lewis, LLP

(57) ABSTRACT

At least one application data set stored in a data repository is obtained. The application data set is analyzed to generate at least one metadata node. The at least one metadata node is combined with at least one other related node to form a hierarchical data structure. One or more valuation algorithms are executed against the hierarchical data structure to calculate a value for the data set represented in the hierarchical data structure.

20 Claims, 9 Drawing Sheets

(56) References Cited

U.S. PATENT DOCUMENTS

| | | | |
|---|---|---|---|
| 9,009,169 | B2 | 4/2015 | Redfern et al. |
| 9,262,451 | B1 | 2/2016 | Singh et al. |
| 9,384,226 | B1 | 7/2016 | Goel et al. |
| 9,465,825 | B2 | 10/2016 | Nelke et al. |
| 9,606,828 | B2 | 3/2017 | Ghosh et al. |
| 9,684,866 | B1 | 6/2017 | Todd, Jr. et al. |
| 9,851,997 | B2 | 12/2017 | Gough et al. |
| 10,324,962 | B1 | 6/2019 | Todd et al. |
| 10,325,115 | B1 | 6/2019 | Zeldin et al. |
| 10,430,775 | B1* | 10/2019 | Bialostocki ............ G06F 16/285 |
| 2001/0042062 | A1 | 11/2001 | Tenev et al. |
| 2002/0169658 | A1 | 11/2002 | Adler |
| 2004/0088239 | A1 | 5/2004 | Eder |
| 2004/0122646 | A1 | 6/2004 | Colossi et al. |
| 2004/0193587 | A1 | 9/2004 | Yamashita |
| 2005/0182739 | A1 | 8/2005 | Dasu et al. |
| 2006/0173873 | A1 | 8/2006 | Prompt et al. |
| 2007/0005383 | A1 | 1/2007 | Kasower |
| 2007/0136223 | A1 | 6/2007 | Bae et al. |
| 2008/0195542 | A1 | 8/2008 | Zarawani |
| 2008/0201340 | A1* | 8/2008 | Thonangi ............... G06N 20/00 |
| 2009/0018996 | A1 | 1/2009 | Hunt et al. |
| 2009/0119262 | A1 | 5/2009 | Guo et al. |
| 2009/0282089 | A1 | 11/2009 | Lakshmanachar et al. |
| 2009/0327257 | A1 | 12/2009 | Abouzeid et al. |
| 2009/0327921 | A1 | 12/2009 | Holm-Peterson et al. |
| 2010/0030734 | A1 | 2/2010 | Chunilal |
| 2010/0094685 | A1 | 4/2010 | Young |
| 2010/0153324 | A1 | 6/2010 | Downs et al. |
| 2011/0010100 | A1 | 1/2011 | Li et al. |
| 2011/0040636 | A1 | 2/2011 | Simmons et al. |
| 2011/0055699 | A1 | 3/2011 | Li et al. |
| 2011/0078603 | A1 | 3/2011 | Koomullil |
| 2011/0153508 | A1 | 6/2011 | Jhunjhunwala |
| 2012/0030220 | A1 | 2/2012 | Edwards et al. |
| 2012/0084261 | A1 | 4/2012 | Parab |
| 2012/0116911 | A1 | 5/2012 | Irving et al. |
| 2012/0123994 | A1 | 5/2012 | Lowry et al. |
| 2012/0310684 | A1 | 12/2012 | Carter |
| 2012/0323843 | A1 | 12/2012 | Bice et al. |
| 2013/0036091 | A1 | 2/2013 | Provenzano et al. |
| 2013/0055042 | A1 | 2/2013 | Al Za'noun et al. |
| 2013/0073594 | A1 | 3/2013 | Jugulum et al. |
| 2013/0110842 | A1 | 5/2013 | Donneau-Golencer et al. |
| 2013/0151423 | A1 | 6/2013 | Schmidt et al. |
| 2014/0052489 | A1 | 2/2014 | Prieto |
| 2014/0222966 | A1* | 8/2014 | Marins ..................... H04L 67/02 |
| | | | 709/219 |
| 2014/0280371 | A1 | 9/2014 | Bastide et al. |
| 2014/0324856 | A1 | 10/2014 | Lahiani et al. |
| 2015/0120555 | A1 | 4/2015 | Jung et al. |
| 2015/0121280 | A1 | 4/2015 | Slatner et al. |
| 2015/0134591 | A1 | 5/2015 | Staeben et al. |
| 2015/0193145 | A1 | 7/2015 | Johnson et al. |
| 2015/0293974 | A1 | 10/2015 | Loo |
| 2016/0055184 | A1 | 2/2016 | Fokoue-Nkoutche et al. |
| 2016/0110819 | A1 | 4/2016 | Abramowitz |
| 2016/0132608 | A1 | 5/2016 | Rathod |
| 2016/0144194 | A1 | 5/2016 | Roothans et al. |
| 2016/0196311 | A1 | 7/2016 | Wang et al. |
| 2016/0217490 | A1 | 7/2016 | Malik et al. |
| 2016/0224430 | A1 | 8/2016 | Long et al. |
| 2016/0259693 | A1 | 9/2016 | Sundararaman et al. |
| 2016/0378919 | A1 | 12/2016 | McNutt et al. |
| 2017/0116345 | A1 | 4/2017 | Cameron |
| 2017/0236060 | A1 | 8/2017 | Ignatyev |
| 2017/0293655 | A1 | 10/2017 | Ananthanarayanan et al. |
| 2018/0082030 | A1 | 3/2018 | Allen et al. |

OTHER PUBLICATIONS

Doug Laney, "The Economics of Information Assets," The Center For Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

U.S. Appl. No. 14/998,112 filed in the name of Stephen Todd et al. filed Dec. 24, 2015 and entitled "Data Valuation Based on Development and Deployment Velocity."

U.S. Appl. No. 14/973,096 filed in the name of Stephen Todd et al. filed Dec. 17, 2015 and entitled "Data Set Valuation for Service Providers."

U.S. Appl. No. 14/973,141 filed in the name of Stephen Todd et al. filed Dec. 17, 2015 and entitled "Automated Data Set Valuation and Protection."

U.S. Appl. No. 14/973,178 filed in the name of Stephen Todd filed Dec. 17, 2015 and entitled "Timeliness Metrics and Data Valuation in Distributed Storage Systems."

\* cited by examiner

100

200

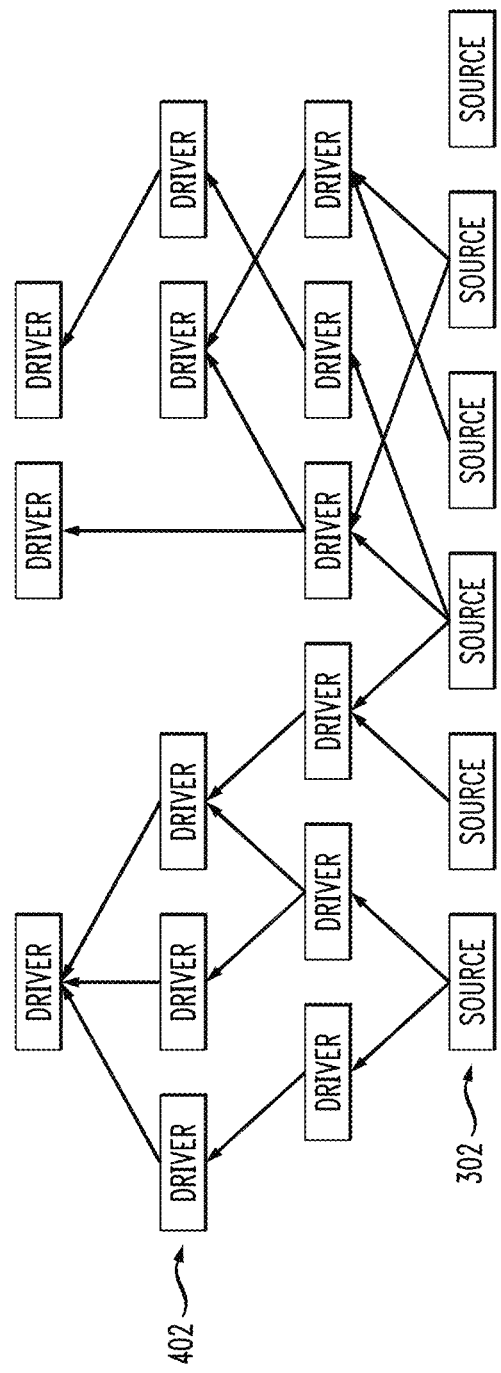

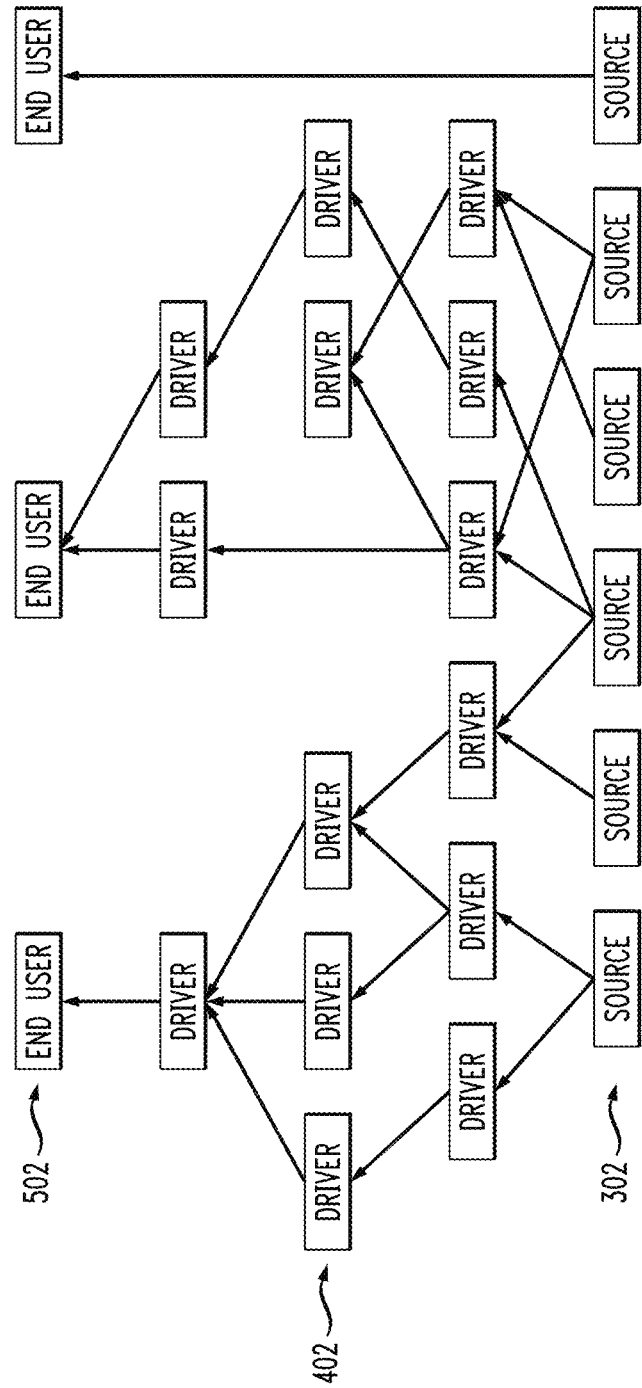

600

700

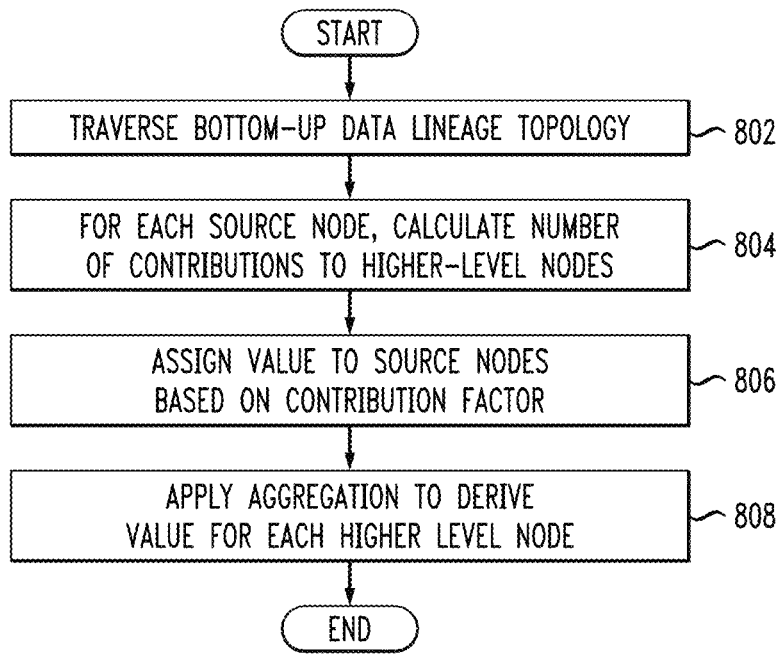
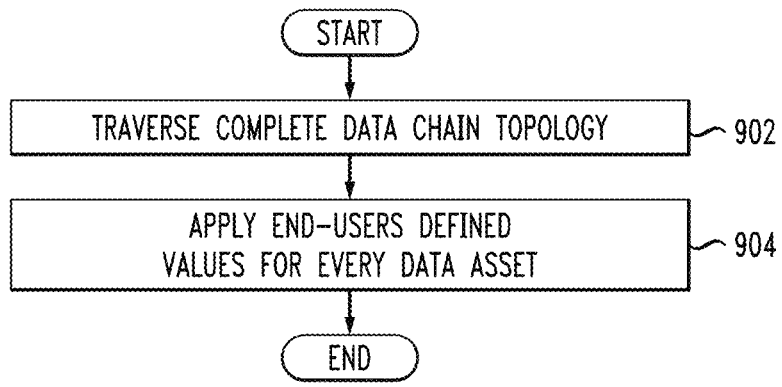

1100

METADATA-BASED DATA VALUATION

FIELD

The field relates generally to data processing and, more particularly, to data valuation.

BACKGROUND

Data is a valuable resource for an enterprise. Typically, data received and generated by an enterprise is stored in a data lake maintained by the enterprise. A data lake is typically considered to be a functionally centralized data storage system for unstructured and structured data. However, there are relatively few, if any, industry standards, tools, or technologies that can assist in quantifying the actual value of data in real-time.

SUMMARY

Embodiments of the invention provide techniques for metadata-based data valuation.

For example, in one embodiment, a method comprises the following steps. At least one application data set stored in a data repository is obtained. The application data set is analyzed to generate at least one metadata node. The metadata node is combined with at least one other related node to form a hierarchical data structure. One or more valuation algorithms are executed against the hierarchical data structure to calculate a value for the data set represented in the hierarchical data structure.

In another embodiment, a method comprises the following steps. At least one application data set stored in a data repository is obtained. The application data set contains data generated by a plurality of application program types comprising: a source type, an intermediate type, and a destination type, wherein at least one source type application generates source data, at least one destination type application generates end-user deliverable data, and at least one intermediate type application generates driver data (e.g., intermediate data that helps drive analytic results) in between the source data and the end-user deliverable data. At least a portion of the source data generated by the source type application is analyzed to generate one or more source metadata attributes. At least a portion of the driver data generated by the intermediate type application is analyzed to generate one or more driver metadata attributes. At least a portion of the end-user deliverable data generated by the destination type application is analyzed to generate one or more end-user deliverable metadata attributes. A metadata hierarchical structure is formed comprising a source level of valuation nodes, a driver level of valuation nodes, and an end-user level of valuation nodes. The one or more source metadata attributes populate the source level valuation nodes, the one or more driver metadata attributes populate the driver level valuation nodes, and the end-user deliverable metadata attributes populate the end-user level valuation nodes. One or more source level valuation nodes point to one or more driver level valuation nodes, and one or more driver level valuation nodes point to one or more end-user level valuation nodes. Values are assigned to the valuation nodes at each level of the metadata hierarchical structure, and a data valuation is determined for at least a portion of the application data set stored in the data repository based on the values assigned to at least a subset of the valuation nodes of the metadata hierarchical structure.

Advantageously, illustrative embodiments provide a data value analysis model using a metadata-based approach. In the illustrative approach, data value is quantified in real-time by creating and organizing metadata using a pre-defined model, applying various analytics to quantify real-time data value, and normalizing the analyses using data management architecture and algorithms.

These and other features and advantages of the invention will become more readily apparent from the accompanying drawings and the following detailed description.

BRIEF DESCRIPTION OF THE DRAWINGS

FIG. 3 illustrates source valuation nodes, according to an embodiment of the invention.

FIG. 4 illustrates driver valuation nodes in relation to source valuation nodes, according to an embodiment of the invention.

FIG. 5 illustrates end user valuation nodes in relation to driver valuation nodes and source valuation nodes, according to an embodiment of the invention.

FIG. 8 illustrates a bottom-up methodology for calculating value based on traversing a metadata node architecture, according to an embodiment of the invention.

FIG. 9 illustrates an end-user defined methodology for calculating value based on traversing a metadata node architecture, according to an embodiment of the invention.

DETAILED DESCRIPTION

Figure 1:
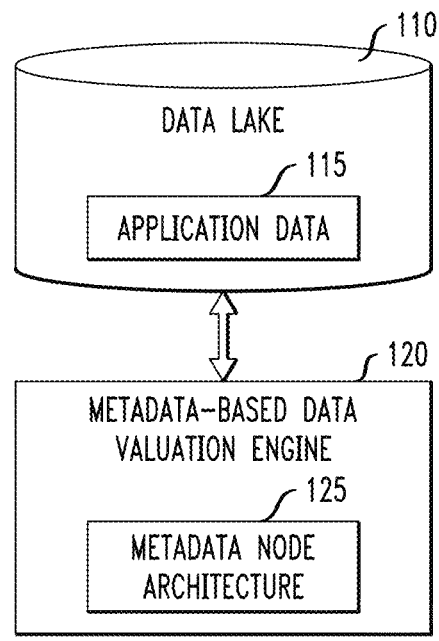
FIG. 1 illustrates a metadata-based data valuation system and its corresponding environment, according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"metadata" illustratively refers to data that describes or defines data;

"valuation" illustratively refers to a computation and/or estimation of something's worth or value; in this case, data valuation is a computation and/or estimation of the value of a data set for a given context;

"context" illustratively refers to time, place, surroundings, circumstances, environment, background, settings, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data).

As mentioned above, there are relatively few, if any, current methodologies that can assist in quantifying the actual value of data in real-time. All approaches currently available to perform any quantifiable value analysis on data revolve around the actual data itself. For many enterprises, enormous amounts of data (of varying complexity and variety) are being generated every second. As such, it is almost impossible to keep up with the speed of ingest by continually running valuation algorithms against the content itself. This results in a lack of capability to get timely valuation results. Furthermore, it is realized that performing valuation approaches against all data volumes will create an enormous compute load. Also, given that valuation algorithms focusing on parsing content would need to continually access that content, these algorithms will be in competition with other production activities (e.g., standard reads and writes against the content). It is highly likely that the valuation algorithms will slow down the performance of the production applications. Still further, often times the users that wish to calculate value do not have full access to the content or encryption keys to access the content. This prevents specific business users from running valuation algorithms. Lastly, valuation algorithms that focus on specific content are not relevant and/or not portable to other enterprise data lakes containing different content that is specific or applicable to different vertical markets.

Embodiments of the invention overcome these and other drawbacks of existing approaches by quantifying data value via metadata as opposed to the data itself. This results in numerous advantages over valuation via production content. Advantages include, but are not limited to, a higher speed of analysis, less computing needs, quick addition or deletion or modification (update) of a metadata attribute, very infrequent access to the direct data itself, fast value calculations, and the ability to add value-specific locks to the data.

In particular, embodiments of the invention analyze an application data set to generate at least one metadata node, which is combined with at least one other related node to form a hierarchical data structure, e.g., a graph. One or more valuation algorithms are executed against the graph to calculate a value for the data set represented in the graph. As will be explained in further embodiments, the graph can have multiple metadata-based valuation nodes at multiple interrelated levels depending on what type of application program (application) yielded the application data.

FIG. 1 illustrates a metadata-based data valuation system and its corresponding environment, according to an embodiment of the invention. As shown, in system environment 100, a data lake 110 comprises application data 115. Application data 115 comprises one or more data sets generated by a set of application programs (not expressly shown). A metadata-based valuation engine 120 creates, maintains, and utilizes a metadata node architecture 125 (e.g., a hierarchical data structure or graph) to calculate one or more values for the one or more data sets, as will be explained in illustrative detail.

In an illustrative embodiment, the generation of valuation metadata starts with classifying three types of applications that are typically involved in analytic activity. Source type applications are applications that generate "raw" or "source" data (e.g., SAP® applications). Intermediate type applications are applications that analyze raw data and create "driver" data which is intermediate data that helps drive analytic results/visualizations (e.g., Hive™ applications). These intermediate type applications can also recursively analyze driver data and generate additional intermediate data. Destination type applications are applications that analyze raw or driver data and create end-user reports and/or visualizations (e.g., Tableaux applications). Assume these three types of applications are contributing content (e.g., application data 115) into a data lake (e.g., data lake 110).

Figure 2:
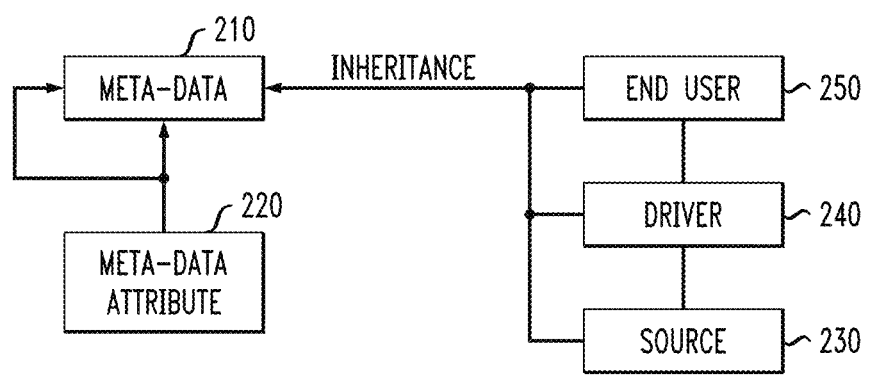
FIG. 2 illustrates a valuation metadata model, according to an embodiment of the invention.

One of the main concepts of the metadata valuation approach described herein is the creation of valuation metadata that describes the content created by each one of the three application classes mentioned above. FIG. 2 illustrates a valuation metadata model that employs these three classes or types of metadata, according to an embodiment of the invention. As shown in model 200, a metadata node 210 comprises one or more metadata attributes 220. The attributes 220 can come from source metadata 230, driver metadata 240, or end-user metadata 250, depending on the type of valuation node being generated. The three classes of metadata can be populated with a variety of attributes (discussed below) and layered using the following method and hierarchical data structure as shown in various stages via FIGS. 3-5.

At the bottom-most level, in one embodiment, one source valuation node is created and maintained for each data source generated by a primary or source application. FIG. 3 depicts a visualization 300 of a hierarchical data structure with this level as source level 302. As "driver" applications (e.g., applications involved in ETL (extract, transform, and load) or ELT (extract, load, and transform) activities) access the source code and generate intermediate results, a multi-layered set of driver nodes can be placed on top of the source valuation nodes. FIG. 4 depicts a visualization 400 of the hierarchical data structure with this level as driver level 402. Finally, the end-user valuation metadata is a single layer of nodes that exist above the driver layer. FIG. 5 depicts a visualization 500 of the hierarchical data structure with this level as end-user level 502. It is to be appreciated that while hierarchical data structure visualized as 500 in FIG. 5 depicts driver nodes coupled to other driver nodes (i.e., multiple layers of driver nodes), source nodes can likewise be coupled to other sources nodes (i.e., multiple layers of source nodes), and end-user nodes can likewise be coupled to other end-user nodes (i.e., multiple layers of end-user nodes).

Accordingly, the end-user valuation nodes (at level 502) contain metadata describing the data assets at the top of the chain which are the end results of all calculations to derive some business value, for example, but not limited to, applications, reports, dashboards, etc. The driver valuation nodes (at level 402) contain metadata describing all data assets that are results of calculations out of source data assets which are used to reach the final outcome, for example, but not limited to, data warehouse tables, fact tables, etc. The source valuation nodes (at level 302) contain metadata about assets which store the data in its native form as generated by transactional and operational systems, for example, but not limited to, ERP (enterprise resource planning) data, log files, etc.

We now describe how each level of valuation node in the hierarchical data structure 500 can be populated.

Figure 6:
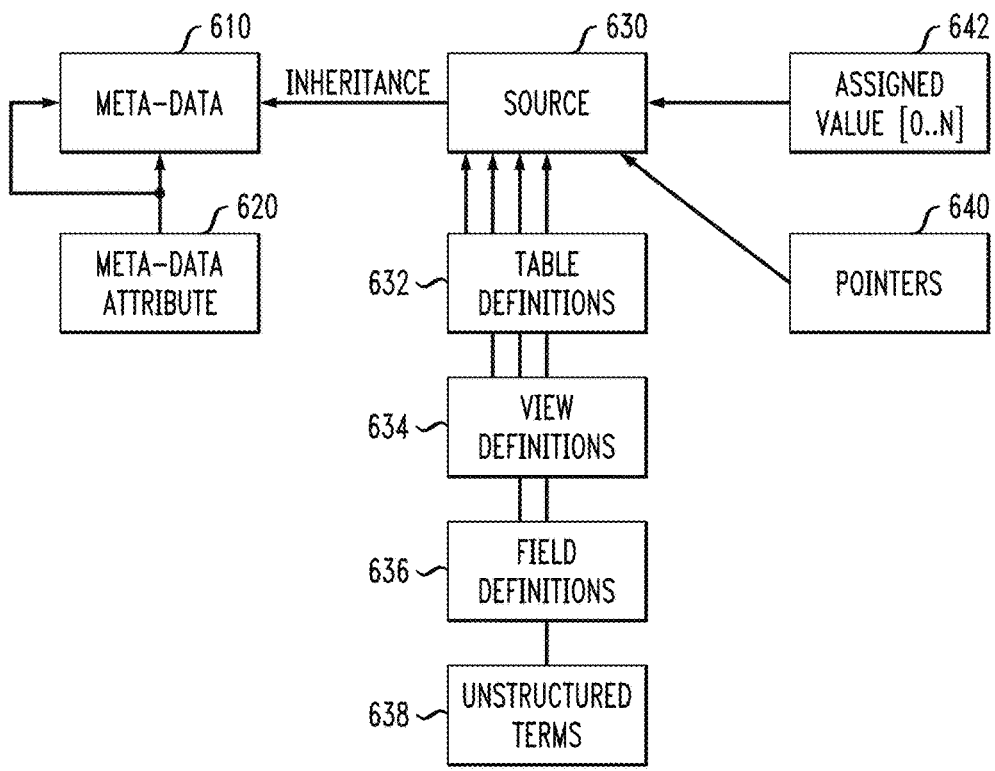
FIG. 6 illustrates details of a source valuation node, according to an embodiment of the invention.

The bottom-most valuation nodes (source metadata) are populated by analyzing the raw data in a data lake (source data). It is not necessary to parse all of the data to create these valuation nodes (but certainly this approach can be done initially). FIG. 6 illustrates a visualization 600 of the type of data stored in a source valuation node. As shown, metadata 610 defined by metadata attributes 620 is stored on source valuation node 630. Examples of metadata attributes include attributes 632 through 638, as will be explained below.

For structured data (e.g., an Oracle® database), the source valuation node is created by gathering such metadata as the definitions of the tables 632, definitions of views 634, and more granular information (definitions) about the fields 636.

For unstructured data 638 (e.g., Hadoop Distributed File System or HDFS), common terms or occurrences can be extracted from the unstructured store and placed into the metadata node. In addition, pointers 640 are stored in association with the source node that create a "data chain" to driver and end-user metadata nodes. The pointers 640 can be implemented, for example, as doubly-linked lists that allow navigation in a top-down or bottom-up method. These definitions are essentially "technical metadata" descriptions that are stored inside a valuation node.

Finally, the source metadata node has a set of assigned values 642 (e.g., [0 . . . N]) that are calculated using the one or more valuation algorithms described below. These assigned values 642 allow the metadata to describe some aspect of the actual data's value.

Driver nodes can be created and populated using similar techniques. When ETL or analytic activity occurs against source data sets, the results cause the population of identical fields (as those shown in FIG. 6) for driver valuation nodes that are placed in a data chain by updating the pointers.

End-user valuation nodes are created when a visualization or report tool (e.g., Tableau® applications) creates a user-visible asset from analyzing some combination of source or driver data assets. During this operation, end-user valuation nodes are created and populated with "business metadata" (as opposed to the "technical metadata" created for source and driver nodes). This "business metadata" contains tables, fields, views, and terms which propagate to the end-user level and are consumed in some fashion by the end user.

Once the full hierarchy of valuation nodes has been created (e.g., as illustratively shown in FIG. 5), there are a variety of approaches for calculating value.

The first approach navigates the hierarchical data structure from the top down (i.e., from end-user valuation nodes to source valuation nodes) and assigns value to metadata nodes during that process.

Figure 7:
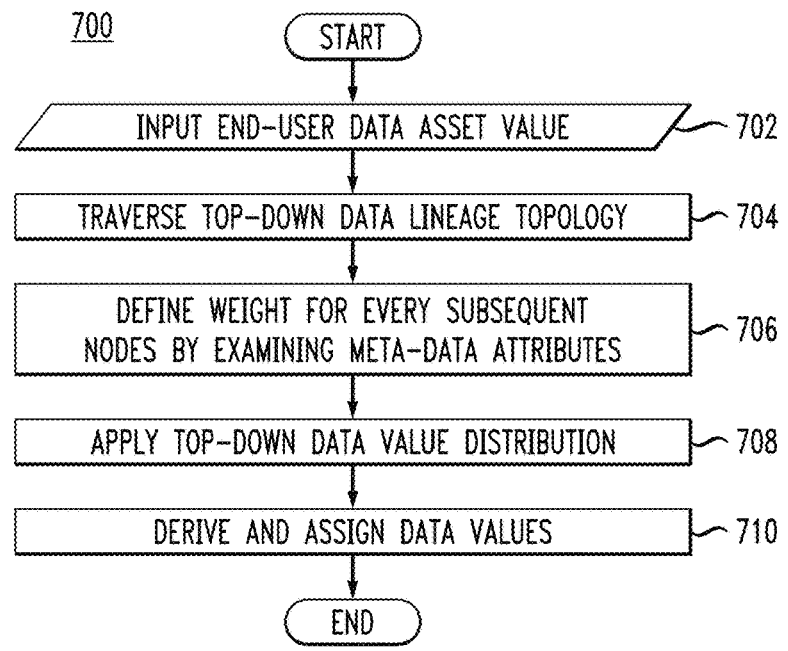
FIG. 7 illustrates a top-down methodology for calculating value based on traversing a metadata node architecture, according to an embodiment of the invention.

FIG. 7 illustrates a top-down algorithm 700 for calculating value based on traversing the hierarchical data structure. A purpose of this algorithm is to know the data value of the driver and source data assets. In many cases, the value of the end-user data assets is more likely to be known. Hence, the data value of all nodes that participated in the derivation of that end-user data asset can be calculated by using this algorithm.

Once the metadata topology (e.g., 500 in FIG. 5) is prepared, the end-user node is given as an input in step 702 to this top-down approach algorithm. This end-user node can be thought of as the "root" node in a graph. The root node attributes (e.g., business metadata) contribute to weight calculations, as will be explained.

The next step (step 704) is to traverse the topology to find all the drivers and/or the source metadata nodes in the chain. For each of these next level nodes, steps 706 through 710 examine the metadata attributes, compare the metadata attributes with the end-user (or root) metadata node attributes (business metadata), and assign weights to each node in accordance to how much of a contribution each node made to the final end-user value. Now that the weights of each node contributing to the end-user data value are known, the algorithm calculates the data value for each node by using the formula: Data_Value=Weight×Root_Node_Data_Value.

These steps are repeated for the source data nodes if the above steps were calculated for driver nodes. In this case, the driver data node is given as a root node to this same algorithm.

Another way to calculate valuation scores is to count the dependencies in the data chain and use that number to assign value. This is a bottom-up approach (i.e., from source valuation nodes to end-user valuation nodes). FIG. 8 illustrates a bottom-up algorithm 800 for calculating value based on traversing the hierarchical data structure. A purpose of this algorithm is to know the data value of the end-user nodes, or in some cases driver data nodes.

By traversing (step 802) all source data nodes to their higher level nodes (which could be driver nodes or end-user nodes), the algorithm can count or otherwise calculate (step 804) the number of times each source node has participated in contributing to the higher level nodes in the data chain (contributing factor). The algorithm now assigns (step 806) the value of each source node based on the contributing factor to the higher level nodes. The formula to calculate the source node value is: Source_Data_Value=(Contributing_Factor/#_of_Higher_Level_Nodes)*100.

For each higher level node (driver or end-user), the algorithm applies aggregation or otherwise calculates (step 808) the data value by using the formula: Data_Value=Sum of (Source_Data_Value).

A third approach to assigning value is to use input provided directly by the end user as to the perceived or actual value of a top-level end-user asset. FIG. 9 illustrates an end-user defined algorithm 900 for calculating value based on traversing the hierarchical data structure. As the hierarchical data structure is traversed (step 902), the end-user assigns (step 904) data value at nodes directly. Usually this approach is performed at the end-user level, but in some cases, the end user could also assign data value to driver data or source data.

Figure 10:
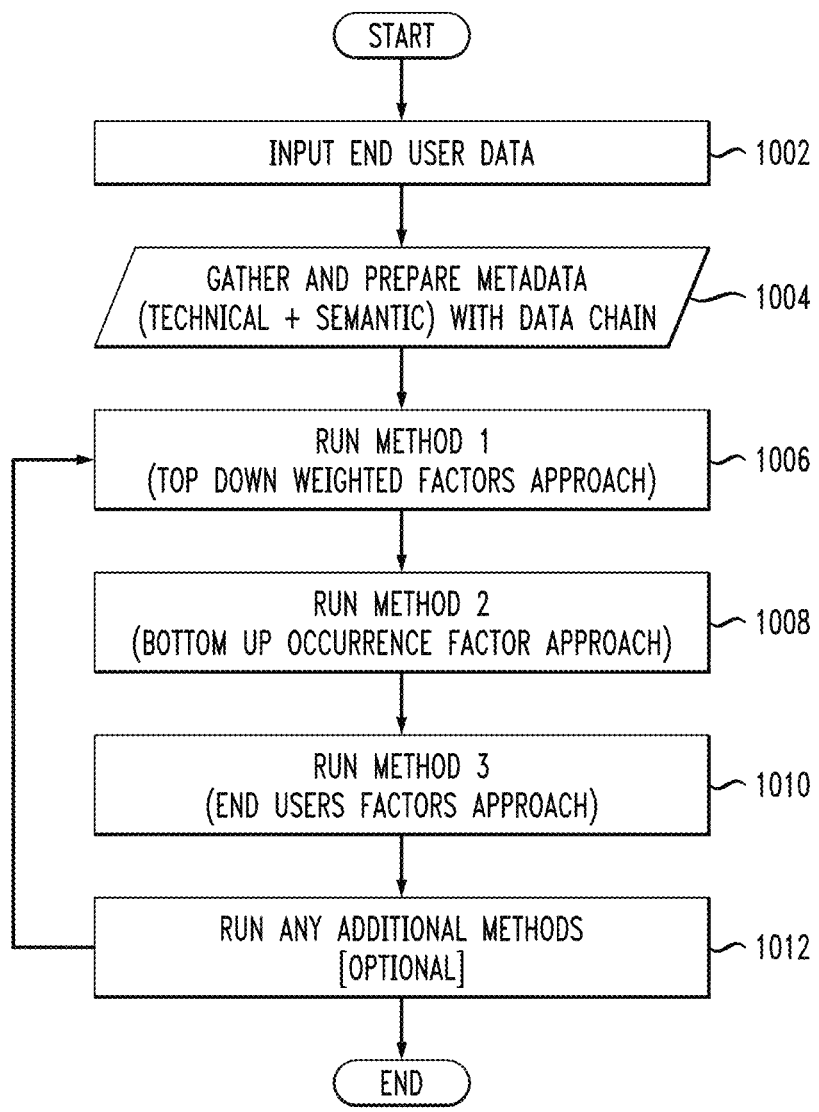
FIG. 10 illustrates a composite methodology for calculating value based on traversing a metadata node architecture, according to an embodiment of the invention.

Lastly, one algorithm can run all three approaches (algorithms 700, 800 and 900) to calculate an overall data value score, as well as adding in other optional approaches. This composite algorithm 1000 is illustrated in FIG. 10. In step 1002, end-user data is input. Metadata is gathered and prepared in step 1004. Then, each valuation approach is performed: top-down approach (FIG. 7) in step 1006; bottom-up approach (FIG. 8) in step 1008; and end-user defined approach (FIG. 9) in step 1010. One or more additional valuation algorithms can be run on the hierarchical data structure, in step 1012, if so desired or needed.

When using the multiple valuation approaches, each node stores a different valuation result. Note that the ability to store multiple valuation scores in one node is part of the data structure depicted in FIG. 6.

One of the primary benefits of the metadata node approach is that the valuation metadata is kept separate from the actual data. This allows for segmentation of the users accessing the data (e.g., data scientists) and the administrators that calculate value.

Valuation algorithms that focus solely on content not only have a scalability problem (ability to process all data in a reasonable amount of time), but they have a portability problem as well. The metadata node approach is neutral to any enterprise vertical market (e.g., medical, oil & gas, retail) etc.

Once a full map of valuation metadata nodes is up and running, over time it is possible to identify candidates for pruning. Likely candidates for pruning include driver data sets that were used to calculate intermediate results but are no longer being used. By navigating all valuation nodes and identifying low-value data sets, a list of candidate data sets can be provided to an administrator for pruning (i.e., deletion).

However, an end user may consider an end-user data set as important, even if it is identified by the system as a low-value data set. In such case, embodiments of the invention allow the end user to place a "lock" on that data set and any other data sets (driver or source) that were part of it in a data chain. By setting a "lock" flag on the top-most valuation node, a set of cascading locks can be set on all intermediate and source nodes that were involved in the generation of the end-user data. This prevents pruning low-value data in the case where a critical user has identified a high-value end-user data set.

Figure 11:
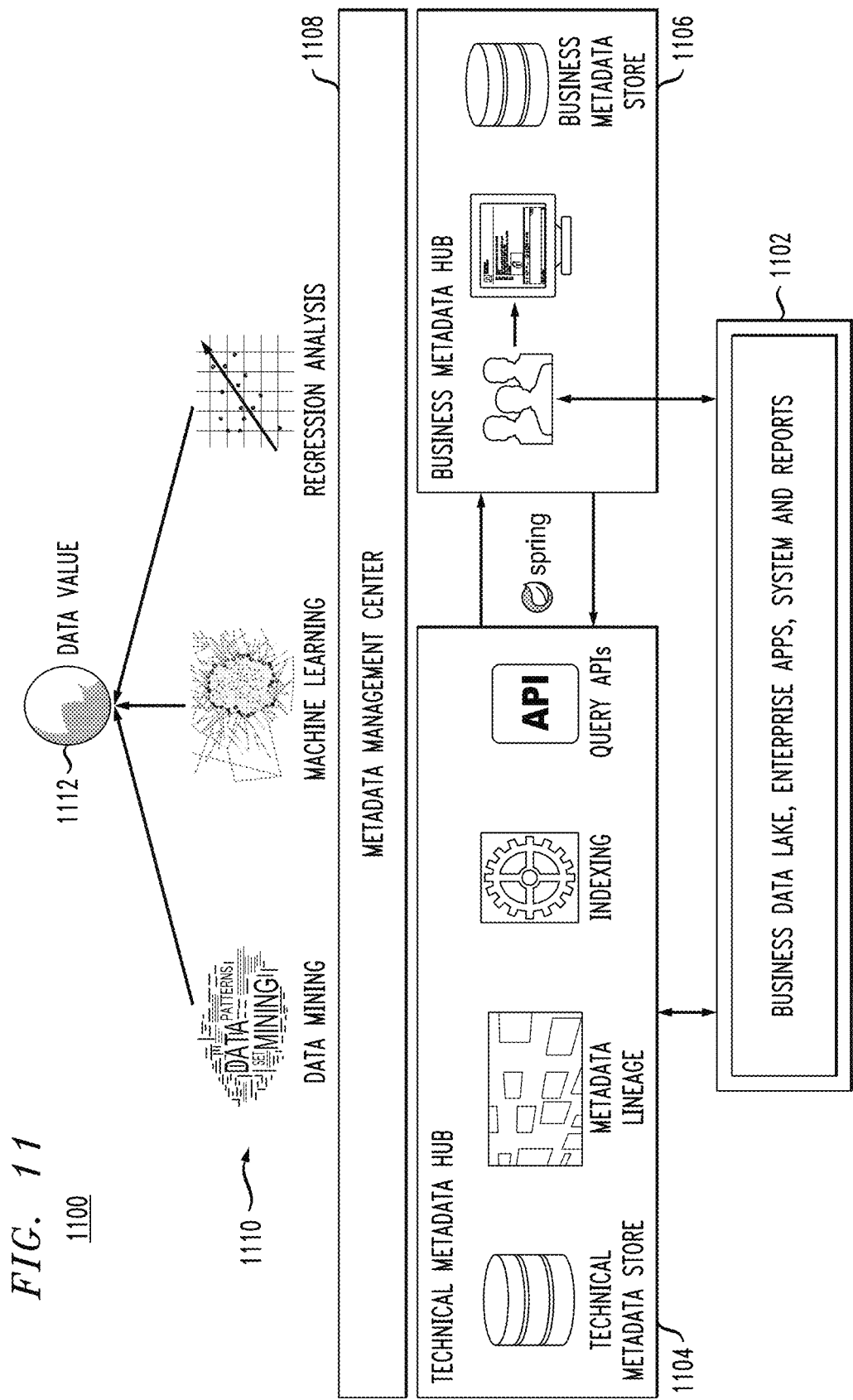
FIG. 11 illustrates details of a metadata-based data valuation system and its corresponding environment, according to an embodiment of the invention.

FIG. 11 illustrates details of an exemplary metadata-based data valuation system and its corresponding environment 1100, according to an embodiment of the invention. As shown, the bottom layer 1102 contains the applications that generate source, driver, and end-user data, as well as the generated data (1102 may be considered a data lake). Oracle®, SAP®, SalesForce®, etc. are examples of applications that generate structured source data. Greenplum® and HDFS applications, for example, can generate structured or unstructured source or driver data. Tableau®, SAP® Business Objects and Oracle® business applications, for example, generate end-user data.

Above layer 1102 is a technical metadata hub 1104, which maintains a technical metadata store (i.e., contains the source and driver valuation nodes). In addition, the metadata lineage can be kept separately or within the technical metadata store. Lastly, all of this metadata is indexed and a query application programming interface (API) allows access to the metadata.

Alongside the technical metadata hub 1104 is business metadata hub 1106 where end-user valuation nodes are kept in the business metadata store. Hub 1106 also contains the valuation algorithms, which can use tools such as Spring XD® to perform queries and shuffle data between the technical and business metadata hubs.

Data valuation techniques can be used across these layers to perform different forms of analytics for calculating value. As shown, for example, data mining, machine learning, and regression analysis are analytics 1110 that access the metadata hubs 1104 and 1106 through a metadata management center (interface or portal) 1108 in order to determine data value 1112 for data sets stored in data lake 1102.

Further, illustrative embodiments allow a user (e.g., enterprise administrator) to execute an operation, through system 1100, such as Value(data), where Value( ) is a function written in a particular programming language and exposed as one or more REST APIs, and the object 'data' is the input on which valuation is requested. It is also to be appreciated that value of a data could depend on the time (instance or period) and where it is requested. In such an embodiment, time and place are considered attributes of the super class node in the hierarchical data structure. These attributes could also contribute in the weight calculations described above. Still further, it is to be understood that hierarchical data structures such as those described herein can have relationships assigned. The assigned relationships would define relations (by designated name) amongst source, driver and end-user nodes. The system is also configured to enable a user to define new types of nodes other than the ones (source, driver, end-user) defined for the current hierarchical data structure.

Advantageously, embodiments of the invention therefore enable the entire process of data valuation by defining and loading a metadata model into a distributed system (e.g., a distributed processing platform as will be illustrated below in the context of FIG. 14), discovery or populating metadata objects from various sources, and continuous data valuation/analysis using various algorithms.

Figure 12:
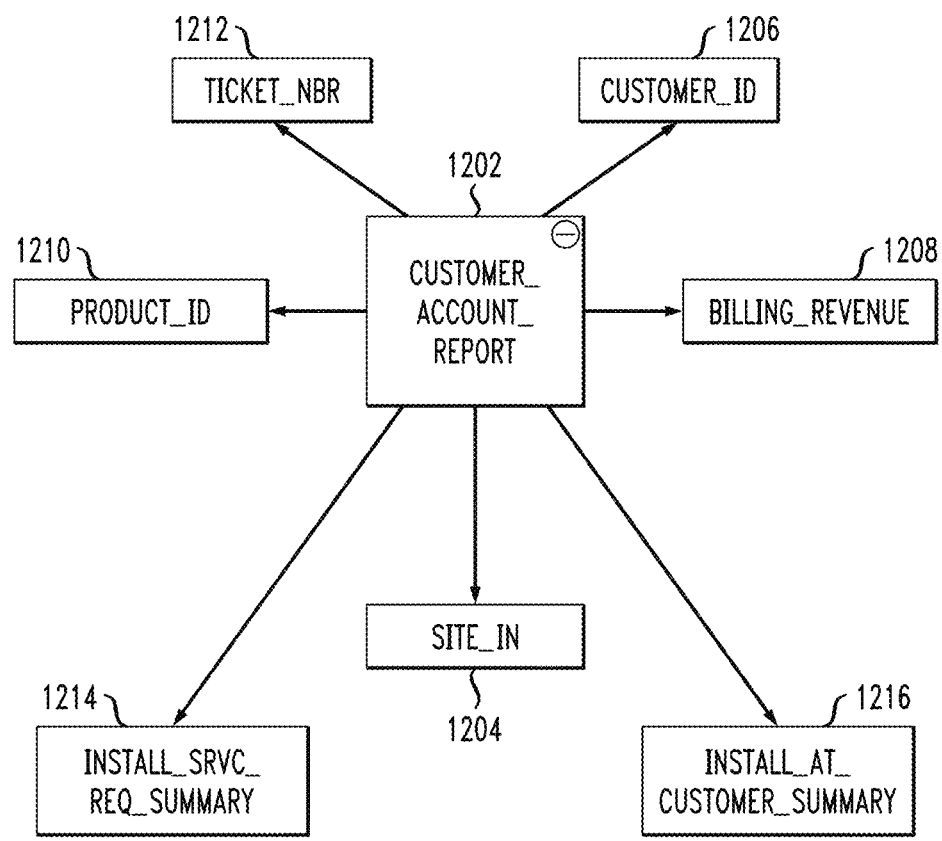
FIG. 12 illustrates a metadata report, according to an embodiment of the invention.
Figure 13:
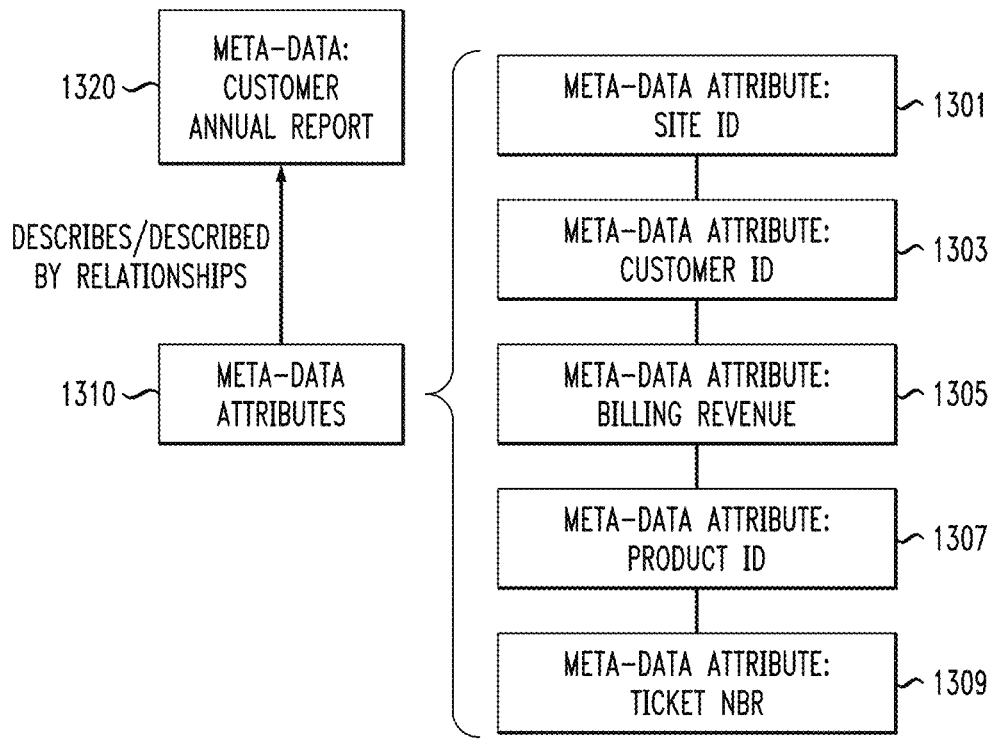
FIG. 13 illustrates a metadata model associated with a metadata report, according to an embodiment of the invention.

We now provide an exemplary use case in the context of FIGS. 12 and 13. More specifically, FIG. 12 illustrates a metadata report and FIG. 13 illustrates a metadata model associated with the metadata report of FIG. 12.

In this use case, assume that John (a salesperson for an enterprise that provides data storage infrastructure for customers) will visit a particular customer site next month and that he wishes to read information beforehand to decide the strategy with that customer site, such as the installed base at that site, revenue generated, customer satisfaction, etc. The data to provide these details includes: (i) Install Base Data to see the products installed at the site; (ii) Service Request Data to see the service tickets and customer satisfaction; and (iii) Finance Data to see the revenue generated from Customer Site. This data is made available to John in a Customer Account report 1202 as depicted in visualization 1200.

This report 1202 carries five metadata attributes:
Site ID (1204)—represents the Customer Site;
Customer ID (1206)—represents the Customer Account;
Billing Revenue (1208)—total revenue generated from the Customer Site;
Product ID (1210)—represents the Product installed at that site; and
Ticket Nbr (1212)—represents Service Request tickets opened for the Customer Site.

The report 1202 also points to Install Base Data (data set) 1214 and Service Request (data set) 1216. Using the metadata-based valuation approach according to one or more illustrative embodiments described herein, a metadata model 1300 representing report 1202 is shown in FIG. 13. More specifically, as shown, metadata node 1320 represents the report which is populated with metadata attributes 1310 including site id metadata attribute 1301, customer id metadata attribute 1303, billing revenue metadata attribute 1305, product id metadata attribute 1307, and ticket number metadata attribute 1309. Advantageously, the metadata node 1320 can be assigned a value by the system based on one or more of the valuation algorithms described herein. This data valuation can then be used by John to make strategy decisions before his visit to the customer.

Figure 14:
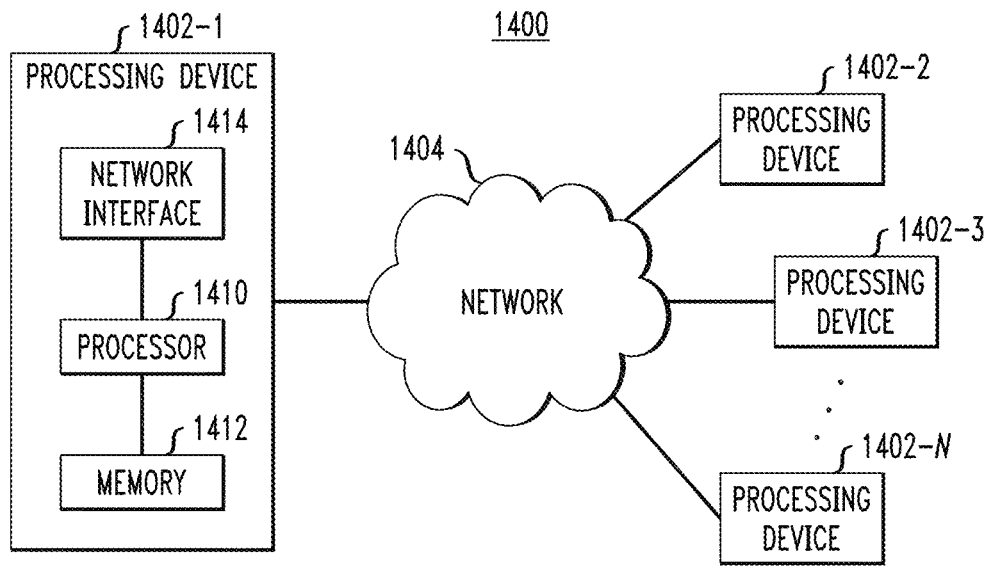
FIG. 14 illustrates a processing platform used to implement a metadata-based data valuation system and its corresponding environment, according to an embodiment of the invention.

As an example of a processing platform on which a metadata-based data valuation system and its corresponding environment (e.g., 100 in FIGS. 1 and 1100 in FIG. 11) according to illustrative embodiments can be implemented is processing platform 1400 shown in FIG. 14. The processing platform 1400 in this embodiment comprises a plurality of processing devices, denoted 1402-1, 1402-2, 1402-3, . . . 1402-N, which communicate with one another over a network 1404. It is to be appreciated that the data valuation methodologies described herein may be executed in one such processing device 1402, or executed in a distributed manner across two or more such processing devices 1402. The cloud infrastructure environment may also be executed in a distributed manner across two or more such processing devices 1402. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 14, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1402-1 in the processing platform 1400 comprises a processor 1410 coupled to a memory 1412. The processor 1410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1410. Memory 1412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1412 may comprise electronic memory such as random access memory (RAM), read-only memory (ROM) or other types of memory, in any combination. The one or more software programs when executed by a processing device such as the processing device 1402-1 causes the device to perform functions associated with one or more of the components/steps of system/methodologies in FIGS. 1-13. One skilled in the art would be readily able to implement such software given the teachings provided herein. Other examples of processor-readable storage media embodying embodiments of the invention may include, for example, optical or magnetic disks.

Processing device 1402-1 also includes network interface circuitry 1414, which is used to interface the device with the network 1404 and other system components. Such circuitry may comprise conventional transceivers of a type well known in the art.

The other processing devices 1402 (1402-2, 1402-3, . . . 1402-N) of the processing platform 1400 are assumed to be configured in a manner similar to that shown for computing device 1402-1 in the figure.

The processing platform 1400 shown in FIG. 14 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 1400. Such components can communicate with other elements of the processing platform 1400 over any type of network, such as a wide area network (WAN), a local area network (LAN), a satellite network, a telephone or cable network, or various portions or combinations of these and other types of networks.

Furthermore, it is to be appreciated that the processing platform 1400 of FIG. 14 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1400 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   obtaining at least one application data set stored in a data repository;
   analyzing the application data set to generate at least one source metadata node, at least one intermediate metadata node and at least one end-user metadata node, the application data set contains data generated by a plurality of application program types comprising: a source type, an intermediate type, and a destination type, wherein at least one source type application generates source data, at least one destination type application generates end-user deliverable data, and at least one intermediate type application generates intermediate data in between the source data and the end-user deliverable data;
   analyzing the source data to generate one or more source metadata attributes, the one or more source metadata attributes describing the source data;
   performing computations on the source data to generate one or more intermediate metadata attributes, the one or more intermediate metadata attributes describing the intermediate data;
   performing computations on at least one of the intermediate data and the source data to generate one or more end-user deliverable metadata attributes, the one or more end-user deliverable metadata attributes describing end-user deliverable data;
   populating the at least one or more source metadata attributes into the at least one source metadata node, the at least one or more intermediate metadata attributes into the at least one intermediate metadata node, and the one or more end-user deliverable attributes into the at least one metadata end-user node;
   combining the at least one source metadata node, the at least one intermediate metadata node and the at least one end-user metadata node to form a hierarchical data structure, the hierarchical data structure comprising source valuation nodes, intermediate valuation nodes, and at least one end-user valuation node;
   determining a data set value for at least a subset of the data set of the hierarchical data structure corresponding to an end-user node value for the at least one end-user valuation node;
   traversing the hierarchical data structure from the at least one end valuation node to the intermediate valuation nodes and the source valuation nodes; and
   assigning node values to the intermediate level valuation nodes and to the source valuation nodes based on respective contributions to the at least one end-user valuation node;
   wherein the steps are implemented via at least one processing device operatively coupled to the data repository.

2. The method of claim 1, further comprising assigning node values to the source valuation nodes, the intermediate valuation nodes, and the at least one end-user valuation node at each level of the hierarchical data structure, and determining the data set value for the application data set stored in the data repository based on the node values assigned to at least a subset of the source valuation nodes, the intermediate valuation nodes, and the at least one end-user valuation node of the hierarchical data structure.

3. The method of claim 2, further comprising defining one or more relationships between the source valuation nodes, the intermediate valuation nodes, and the at least one end-user valuation node of the hierarchical data structure.

4. The method of claim 1, wherein:
   the one or more source metadata attributes describe the source data in a native form.

5. The method of claim 1, wherein:
   the one or more source metadata attributes that populate the source level valuation nodes comprise one or more of: source data table definitions, source data view definitions, source data field definitions, and unstructured source data terms;
   the one or more intermediate metadata attributes that populate the intermediate level valuation nodes comprise one or more of: intermediate data table definitions, intermediate data view definitions, intermediate data field definitions, and unstructured intermediate data terms; and
   the one or more end-user deliverable metadata attributes that populate the end-user level valuation nodes comprise one or more of: end-user data table definitions, end-user data view definitions, end-user data field definitions, and unstructured end-user data terms.

6. The method of claim 1, wherein the one or more end-user deliverable metadata attributes comprise business type metadata, and the one or more source metadata attributes and the one or more intermediate metadata attributes comprise technical type metadata.

7. The method of claim 1, wherein a given one of an intermediate valuation node and a source valuation node is assigned a value equal to a product of a weight and the value of the at least one end-user valuation node that functions as a root node to the given one of the intermediate valuation node and the source valuation node.

8. The method of claim 7, wherein a given source valuation node is assigned a value based at least in part on to a number of the intermediate valuation nodes and the at least one end-user valuation node to which the given source valuation node contributes divided by the total number of intermediate valuation nodes and the at least one end-user valuation node.

9. The method of claim 2, wherein the assigning step further comprises assigning values by an end user assigning values to at least a portion of the source valuation nodes, the intermediate valuation nodes and the at least one end-user valuation node in the hierarchical data structure.

10. The method of claim 1, further comprising modifying the hierarchical data structure by at least one of adding a node, deleting a node, and updating a node.

11. The method of claim 1, wherein the data set value is calculated as a function of at least one of when the data set value is calculated and from where calculation of the data set value is requested.

12. The method of claim 1, further comprising:
identifying, as a candidate data set from the data repository, an application data set that has a data valuation at or below a given low valuation threshold; and
at least one of deleting one or more candidate data sets from the data repository, and locking one or more candidate data sets to prevent deletion from the data repository.

13. An article of manufacture comprising a processor-readable storage medium having encoded therein executable code of one or more software programs, wherein the one or more software programs when executed by one or more processing devices implement the steps of:
obtaining at least one application data set stored in a data repository;
analyzing the application data set to generate at least one source metadata node, at least one intermediate metadata node and at least one end-user metadata node, the application data set contains data generated by a plurality of application program types comprising: a source type, an intermediate type, and a destination type, wherein at least one source type application generates source data, at least one destination type application generates end-user deliverable data, and at least one intermediate type application generates intermediate data in between the source data and the end-user deliverable data;
analyzing the source data to generate one or more source metadata attributes, the one or more source metadata attributes describing the source data;
performing computations on the source data to generate one or more intermediate metadata attributes, the one or more intermediate metadata attributes describing the intermediate data;
performing computations on at least one of the intermediate data and the source data to generate one or more end-user deliverable metadata attributes, the one or more end-user deliverable metadata attributes describing end-user deliverable data;
populating the at least one or more source metadata attributes into the at least one source metadata node, the at least one or more intermediate metadata attributes into the at least one intermediate metadata node, and the one or more end-user deliverable attributes into the at least one metadata end user node;
combining the at least one source metadata node, the at least one intermediate metadata node and the at least one end-user metadata node to form a hierarchical data structure, the hierarchical data structure comprising source valuation nodes, intermediate valuation nodes, and at least one end-user valuation node;
determining a data set value for at least a subset of the data set of the hierarchical data structure corresponding to an end-user node value for the at least one end-user valuation node;
traversing the hierarchical data structure from the at least one end valuation node to the intermediate valuation nodes and the source valuation nodes; and
assigning node values to the intermediate level valuation nodes and to the source valuation nodes based on respective contributions to the at least end-user valuation node.

14. The article of manufacture of claim 13, wherein a given source valuation node is assigned a value based at least in part on to a number of the intermediate valuation nodes and the at least one end-user valuation node to which the given source valuation node contributes divided by the total number of intermediate valuation nodes and the at least one end-user valuation node.

15. The article of manufacture of claim 13, wherein:
the one or more source metadata attributes that populate the source valuation nodes comprise one or more of: source data table definitions, source data view definitions, source data field definitions, and unstructured source data terms;
the one or more intermediate metadata attributes that populate the intermediate valuation nodes comprise one or more of: intermediate data table definitions, intermediate data view definitions, intermediate data field definitions, and unstructured intermediate data terms; and
the one or more end-user deliverable metadata attributes that populate the end-user valuation nodes comprise one or more of: end-user data table definitions, end-user data view definitions, end-user data field definitions, and unstructured end-user data terms.

16. A system comprising:
one or more processors operatively coupled to one or more memories configured to:
obtain at least one application data set stored in a data repository;
analyze the application data set to generate at least one source metadata node, at least one intermediate metadata node and at least one end-user metadata node, the application data set contains data generated by a plurality of application program types comprising: a source type, an intermediate type, and a destination type, wherein at least one source type application generates source data, at least one destination type application generates end-user deliverable data, and at least one intermediate type application generates intermediate data in between the source data and the end-user deliverable data;
analyze the source data to generate one or more source metadata attributes, the one or more source metadata attributes describing the source data;
perform computations on the source data to generate one or more intermediate metadata attributes, the one or more intermediate metadata attributes describing the intermediate data;
perform computations on at least one of the intermediate data and the source data to generate one or more end-user deliverable metadata attributes, the one or more end-user deliverable metadata attributes describing end-user deliverable data;
populate the at least one or more source metadata attributes into the at least one source metadata node the at least one or more intermediate metadata attributes into the at least one intermediate metadata node, and the one or more end-user deliverable attributes into the at least one metadata end-user node;
combine the at least one source metadata node, the at least one intermediate metadata node and the at least one end-user metadata node to form a hierarchical data structure, the hierarchical data structure comprising source valuation nodes, intermediate valuation nodes, and at least one end-user valuation node;

determine a data set value for at least a subset of the data set of the hierarchical data structure corresponding to an end-user node value for the at least one end-user valuation node;

traverse the hierarchical data structure from the at least one end valuation node to the intermediate valuation nodes and the source valuation nodes; and assign node values to the intermediate level valuation nodes and to the source valuation nodes based on respective contributions to the at least one end-user valuation node.

17. The system of claim 16, wherein a given source valuation node is assigned a value based at least in part on a number of the intermediate valuation nodes and the at least one end-user valuation node to which the given source valuation node contributes divided by the total number of intermediate valuation nodes and the at least one end-user valuation node.

18. The system of claim 16, wherein:

the one or more source metadata attributes that populate the source level valuation nodes comprise one or more of: source data table definitions, source data view definitions, source data field definitions, and unstructured source data terms;

the one or more intermediate metadata attributes that populate the intermediate level valuation nodes comprise one or more of: intermediate data table definitions, intermediate data view definitions, intermediate data field definitions, and unstructured intermediate data terms; and the one or more end-user deliverable metadata attributes that populate the end-user level valuation nodes comprise one or more of: end-user data table definitions, end-user data view definitions, end-user data field definitions, and unstructured end-user data terms.

19. The system of claim 16, wherein a given one of an intermediate valuation node and a source valuation node is assigned a value equal to a product of a weight and the value of the at least one end-user valuation node that functions as a root node to the given one of the intermediate valuation node and the source valuation node.

20. The system of claim 16, wherein the one or more end-user deliverable metadata attributes comprise business type metadata, and the one or more source metadata attributes and the one or more intermediate metadata attributes comprise technical type metadata.

* * * * *